US007755709B2

(12) United States Patent
Lee

(10) Patent No.: US 7,755,709 B2
(45) Date of Patent: Jul. 13, 2010

(54) LIQUID CRYSTAL DISPLAY DEVICE HAVING DUMMY CONTACT HOLES AND FABRICATION METHOD THEREOF

(75) Inventor: Seok Woo Lee, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/453,672

(22) Filed: May 18, 2009

(65) Prior Publication Data

US 2009/0233392 A1 Sep. 17, 2009

Related U.S. Application Data

(62) Division of application No. 11/019,280, filed on Dec. 23, 2004, now Pat. No. 7,545,451.

(30) Foreign Application Priority Data

Dec. 30, 2003 (KR) ..................... 10-2003-0099501

(51) Int. Cl.
*G02F 1/136* (2006.01)
*G02F 1/1343* (2006.01)
*G02F 1/1333* (2006.01)

(52) U.S. Cl. .......................... 349/42; 349/43; 349/161; 257/72

(58) Field of Classification Search .............. 349/42–48
See application file for complete search history.

(56) References Cited

U.S. PATENT DOCUMENTS

| | | | | |
|---|---|---|---|---|
| 5,338,959 | A * | 8/1994 | Kim et al. | 257/331 |
| 6,028,580 | A * | 2/2000 | Kosegawa et al. | 345/98 |
| 6,841,434 | B2 * | 1/2005 | Miyairi et al. | 438/166 |
| 6,927,809 | B2 * | 8/2005 | Gotoh et al. | 349/44 |
| 7,545,451 | B2 * | 6/2009 | Lee | 349/42 |
| 2002/0033918 | A1 * | 3/2002 | Shigeno et al. | 349/114 |
| 2003/0181043 | A1 * | 9/2003 | Tanada et al. | 438/689 |

* cited by examiner

*Primary Examiner*—Andrew Schechter
(74) *Attorney, Agent, or Firm*—McKenna Long & Aldridge LLP

(57) ABSTRACT

Disclosed is a liquid crystal display (LCD) device having gate and data driving elements with improved heat dissipation properties. The driving elements each have the following: a source and a drain electrode, each with contact holes that provide electrical contact with an active area formed on the driving element's substrate; multiple separate channels between the source and the drain; and a gate electrode formed crossing the multiple channels. Also formed are dummy contact holes that allow the metal of the electrodes to penetrate to a layer below the active layer without contacting it. The dummy contact hole provides a thermally conductive channel whereby heat that would otherwise build up in the channels, and degrade the performance of the driving element, is conducted through the dummy contact hole and radiated away by the electrode metal.

5 Claims, 12 Drawing Sheets

LIQUID CRYSTAL DISPLAY DEVICE HAVING DUMMY CONTACT HOLES AND FABRICATION METHOD THEREOF

CROSS-REFERENCE TO RELATED APPLICATIONS

This application is a Divisional of application Ser. No. 11/019,280 filed Dec. 23, 2004, now U.S. Pat. No. 7,545,451; which claims priority to Korean Patent Application No. 10-2003-0099501, filed Dec. 30, 2003 all of which are hereby incorporated by reference for all purposes as if fully set forth herein.

BACKGROUND OF THE INVENTION

1. Field of the Invention

The present invention relates to a liquid crystal display device and fabrication method thereof.

2. Discussion of the Related Art

In general, a liquid crystal display device (LCD) displays pictures corresponding to video signals on a liquid crystal panel having a plurality of liquid crystal (LC) cells arranged in a matrix configuration by adjusting light transmittance each of the LC cells.

Thin film transistors (TFTs) are used as a switching element for switching the LC cells. The TFTs generally use amorphous silicon or polycrystalline silicon (polysilicon) as a semiconductor layer. The amorphous silicon (a-Si) TFT has an advantage of relatively good uniformity, resulting in a more stable TFT. However, the a-Si also has a disadvantage that carrier mobility is low and thus response rate is slow. Hence, it is difficult to employ the a-Si TFT as a driving element, such as a gate driver or a data driver, for a high resolution display panel requiring a rapid response time.

A polysilicon TFT is suitable for a high resolution display panel requiring a rapid response time due to its high carrier mobility, and permits peripheral driving circuits to be built in the display panel. Accordingly, an LCD employing the polysilicon TFTs is preferred for high resolution.

FIG. 1 is a schematic plane view of an LCD employing polysilicon TFTs according to the related art. Referring to FIG. 1, the LCD includes an image display part 196 having a matrix of a plurality of pixels, a data driver 192 for driving data lines of the image display part 196, and a gate driver 192 for driving gate lines 102 of the image display part 196. The image display part 196 includes LC cells arranged in a matrix configuration so as to display an image.

Each of the LC cells is connected at a crossing point of the gate line 102 and the data line 104, and is driven by a TFT 130 employing n-type impurity-doped polysilicon as a switching element. The n-type TFT 130 applies a video signal from the data line 104, i.e., a pixel signal in response to a scan pulse from the gate line 102 and charges the LC cell according to the video signal. In response, the LC cell adjusts light transmittance according to the extent to which it is charged.

The gate driver 194 sequentially drives the gate lines 102 during a horizontal period every frame depending on a gate control signal. The TFTs 130 are sequentially turned on in horizontal rows by the gate driver 194 so that the appropriate video signal on the data line 104 is connected to the proper the LC cells.

The data driver 192 performs a sampling of a plurality of digital data signals every a horizontal period and converts the sampled digital data signal into an analog data signal. The data driver 192 supplies the analog data signal to the data lines 104.

Accordingly, the LC cells connected to the TFTs are turned on to adjust light transmittance in response to a data signal of each of the data lines 104.

The gate driver 194 and the data driver 192 include driving elements connected in a CMOS structure. The driving element is made in one large TFT having a large channel width (W1) such that a large amount of current flows for a relatively high switching voltage. The driving element is made of polysilicon for a rapid response time.

FIG. 2 is a plane view of a driving element of a driving circuit part in an LCD according to the related art, and FIG. 3 is a sectional view taken along the line I-I' of FIG. 2.

Referring to FIGS. 2 and 3, the driving element having one TFT includes an impurity (n+ ions or p+ ions)-doped active layer 174, and a gate electrode 166 overlapping a channel region 174C of the active layer 174 with a gate insulating layer 142 between the gate electrode 166 and the channel region 174C. The driving element also includes source electrode 168 and drain electrode 170 insulated from the gate electrode 166 with interposing an interlayer insulating layer 156, and a passivation layer 148 formed on the source electrode 168 and the drain electrode 170. FIG. 3 further illustrates a substrate 120 and a buffer layer 116.

The source electrode 168 and the drain electrode 170 are respectively connected, through source contact hole 184S and drain contact hole 184D, to the source region 174S and drain region 174D, which are implanted with impurities. Source and drain contact holes 184S and 184D provide contact through gate insulating layer 142 and the interlayer insulating layer 156. The passivation layer 148 is formed on the source electrode 168 and the drain electrode 170 to protect the driving element.

The driving element having one TFT has an advantage in that a large amount of current flows through the device and has a disadvantage in that a large amount of heat is generated due to the large amount of current. Hence, to radiate heat generated in the channel 174C, the related art provides a driving element having a multi channel structure where TFTs having a plurality of small channel widths W2 are connected in parallel.

The driving element of the driving circuit part of the LCD illustrated in FIG. 4 is designed such that a sum of respective channel widths W2 is basically equal to one channel width W1 and a plurality of unit TFTs having a unit channel 277 have active layers separated from one another and connected in parallel.

In the plurality of unit TFTs having active layers separated from one another, the source and drain contact holes 284S and 284D are disposed at adjacent TFTs. FIG. 5 illustrates a section structure taken along the line II-II' of FIG. 4. FIG. 5 illustrates a section taken along the line II-II' on a drain electrode of FIG. 4, which is basically the same in structure as the source contact holes of the unit TFTs.

As illustrated in FIGS. 4 and 5, the plurality of TFTs are formed on a lower substrate 220 such that an interval between the respective unit channels 277 is constant within a limited distance, thereby forming multiple channels. Source and drain electrodes 268 and 270 are respectively in contact with the active layer 274 through the source and drain contact holes 284S and 284D. A passivation layer 248 is formed on the source and drain electrodes 268 and 270.

In the TFT having the multi channels divided at an equal interval, heat buildup, as it occurs in the center of a single channel, is reduced. Specifically, heat generated from the channel 277 of the TFT is absorbed by a gate insulating layer 242 and an interlayer insulating layer 256. The gate insulating layer 242, the interlayer insulating layer 256, and a buffer layer 216 are made of insulator such as $SiO_2$ having a low dielectric and a low thermal conductivity, which thereby decreases parasitic capacitance.

Heat is generally not sufficiently dissipated from the gate insulating layer 242 and the interlayer insulating layer 256 between the drain contact holes 284D. The excess heat degenerates the devices and disturbs smooth current flow and performance of the driving element. This deterioration may cause abnormal operation and failure of the driving element.

SUMMARY OF THE INVENTION

Accordingly, the present invention is directed to a liquid crystal display (LCD) and fabrication method thereof that substantially obviates one or more problems due to limitations and disadvantages of the related art.

An advantage of the present invention is to provide an LCD and fabrication method thereof that can prevent a driving element from being degraded by forming a dummy contact hole near an active layer in a driving circuit part of the LCD to conduct and radiate away heat generated from a channel.

Another advantage of the present invention is to provide an LCD driving element with improved thermal dissipation characteristics.

Yet another advantage of the present invention is to provide an LCD driving element that can drive greater current loads while avoiding thermally-induced device degradation.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and described herein, a driving element for a liquid crystal display device comprises a substrate; a buffer layer formed on the substrate; an active layer formed on the substrate and the buffer layer, the active layer having an active layer pattern, the active layer pattern having at least two channels; an insulating layer formed on the substrate, the buffer layer, and the active layer, the insulating layer having a first dummy contact hole located on the substrate separate from the active layer pattern; and an electrode layer formed on the substrate, the electrode layer making contact with the buffer layer through the first dummy contact hole.

In another aspect of the present invention, an LCD comprises an active layer having at least two separate channels; a gate electrode formed on the channels of the active layer; and source electrode and drain electrode connected with the active layer through contact holes and also connected with a lower layer through a dummy contact hole formed between the channels of the active layer.

In a further aspect of the present invention, a method of fabricating an LCD comprises forming a buffer layer on a substrate; forming an active layer having at least two divided channels on the buffer layer; forming a first insulating layer on the buffer layer and the active layer; forming a gate electrode on the first insulating layer; forming a second insulating layer on the gate electrode and the first insulating layer; forming a contact hole penetrating the first insulating layer and the second insulating layer; forming a dummy contact hole penetrating the first insulating layer and the second insulating layer disposed on a region between the channels of the active layer; and forming source and drain electrodes connected with the active layer through the contact hole and connected with a lower layer through the dummy contact hole.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the Drawings.

DETAILED DESCRIPTION OF THE ILLUSTRATED EMBODIMENTS

Reference will now be made in detail to embodiments of the present invention, examples of which are illustrated in the accompanying drawings.

Figure 1:
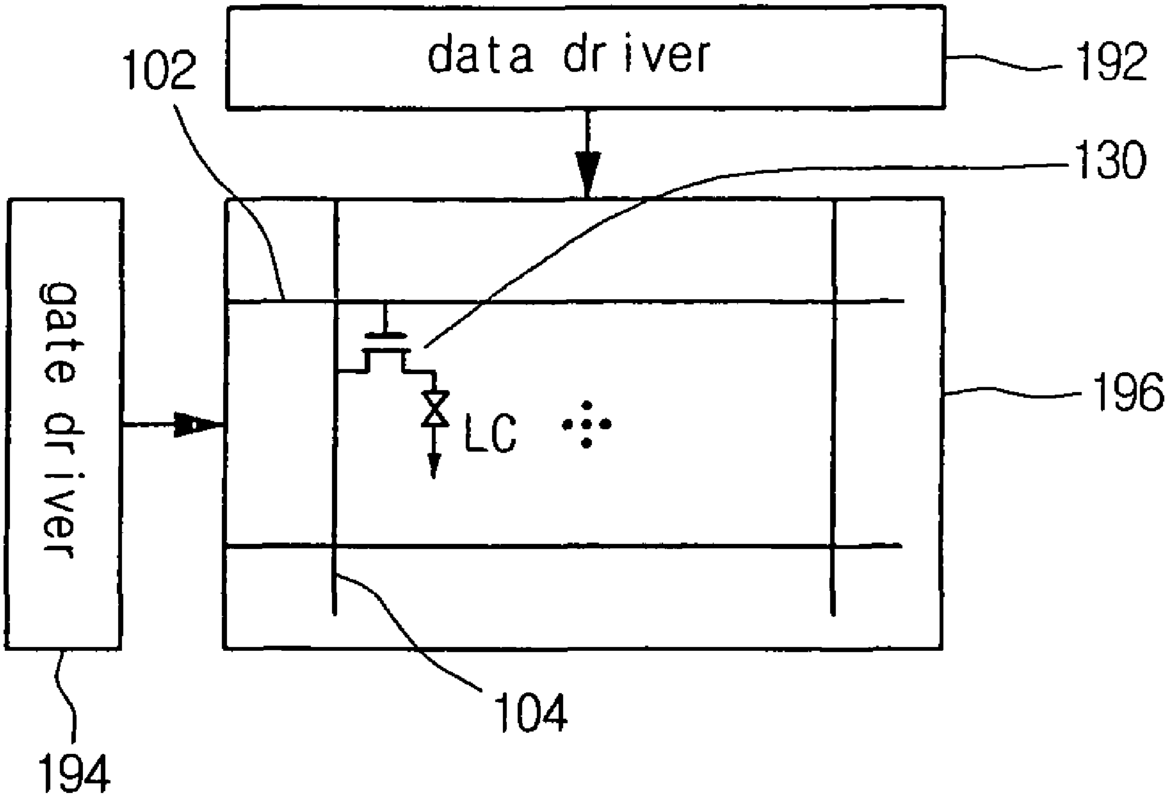
FIG. 1 is a schematic plane view of an LCD employing TFTs according to the related art.
Figure 2:
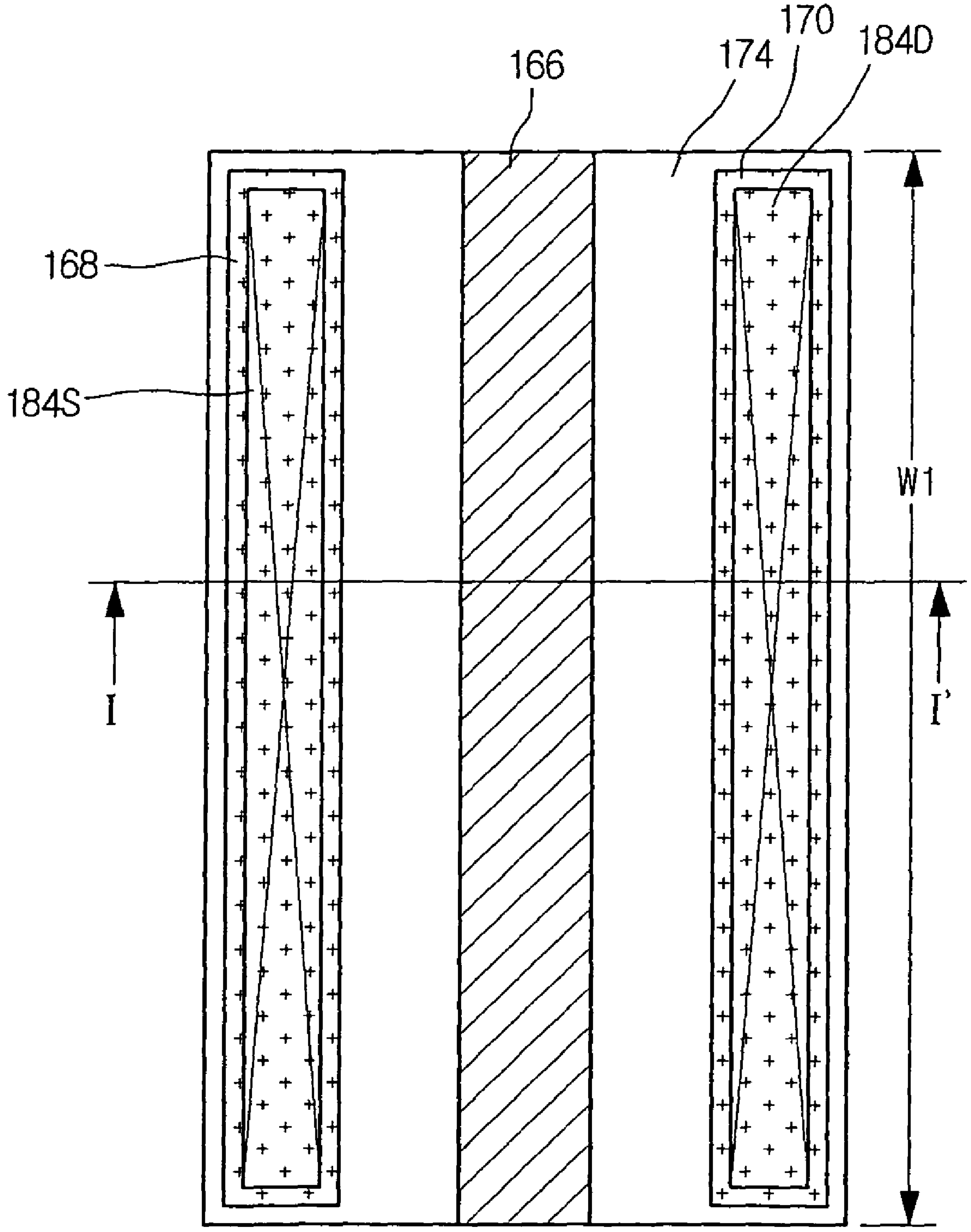
FIG. 2 is a plane view of a driving element of a driving circuit part in an LCD according to the related art.
Figure 3:
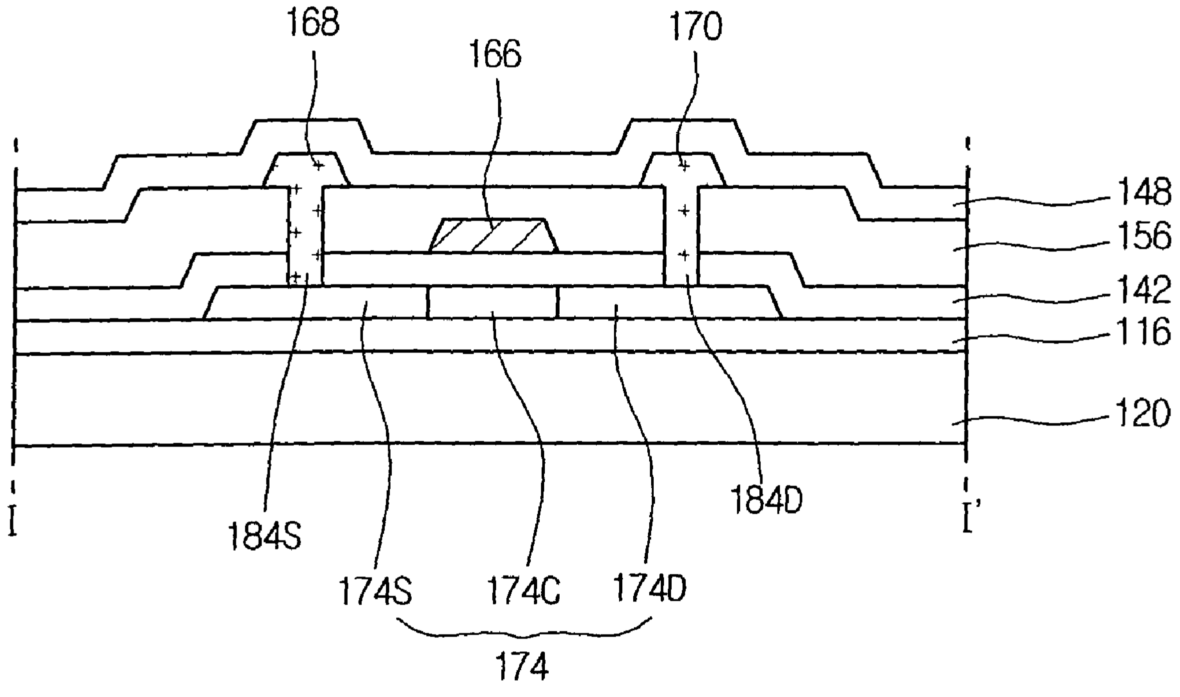
FIG. 3 is a sectional view taken along the line I-I' of FIG. 2.
Figure 4:
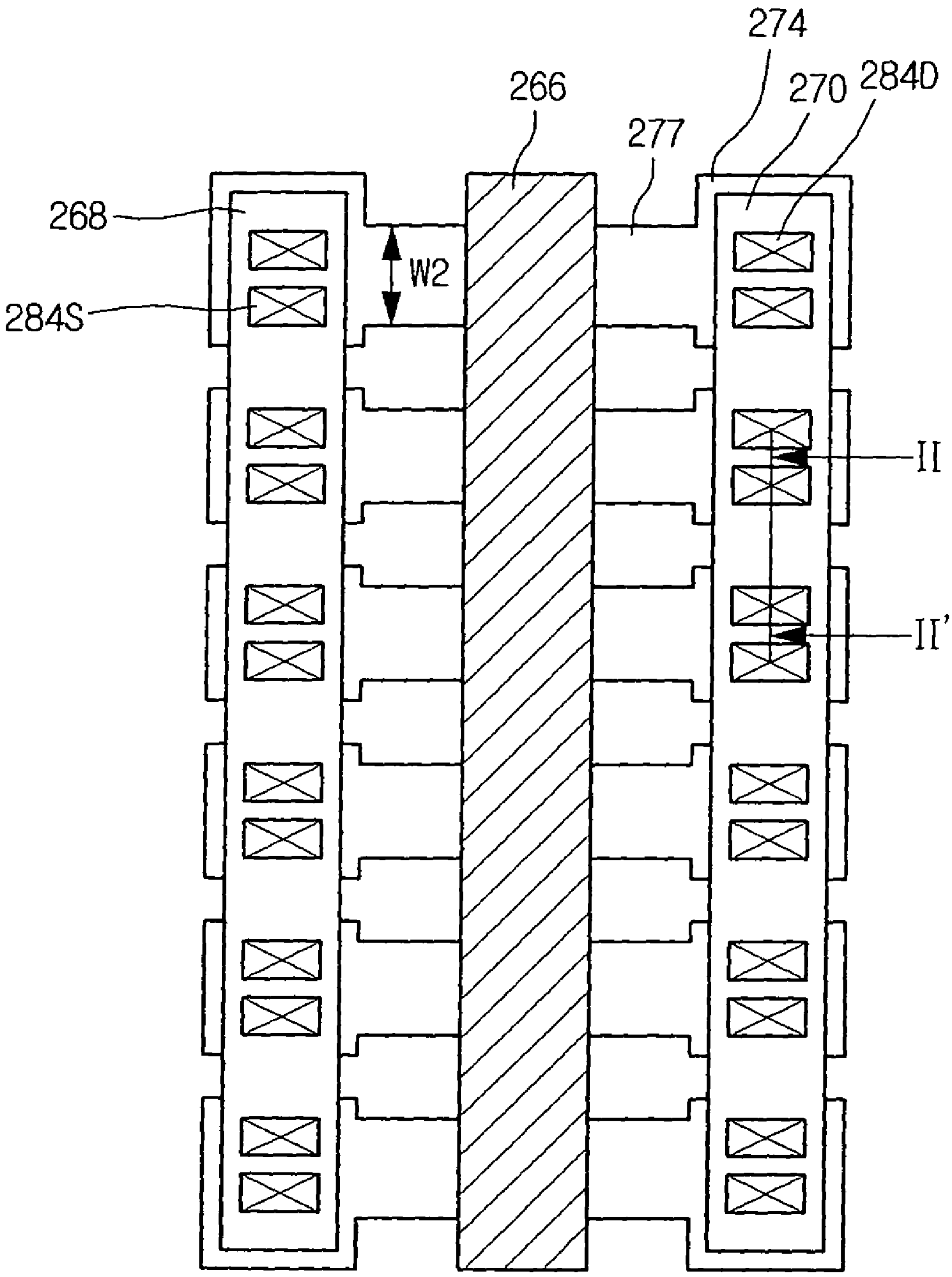
FIG. 4 is a plane view of a driving element of a driving circuit part in an LCD according to the related art.
Figure 5:
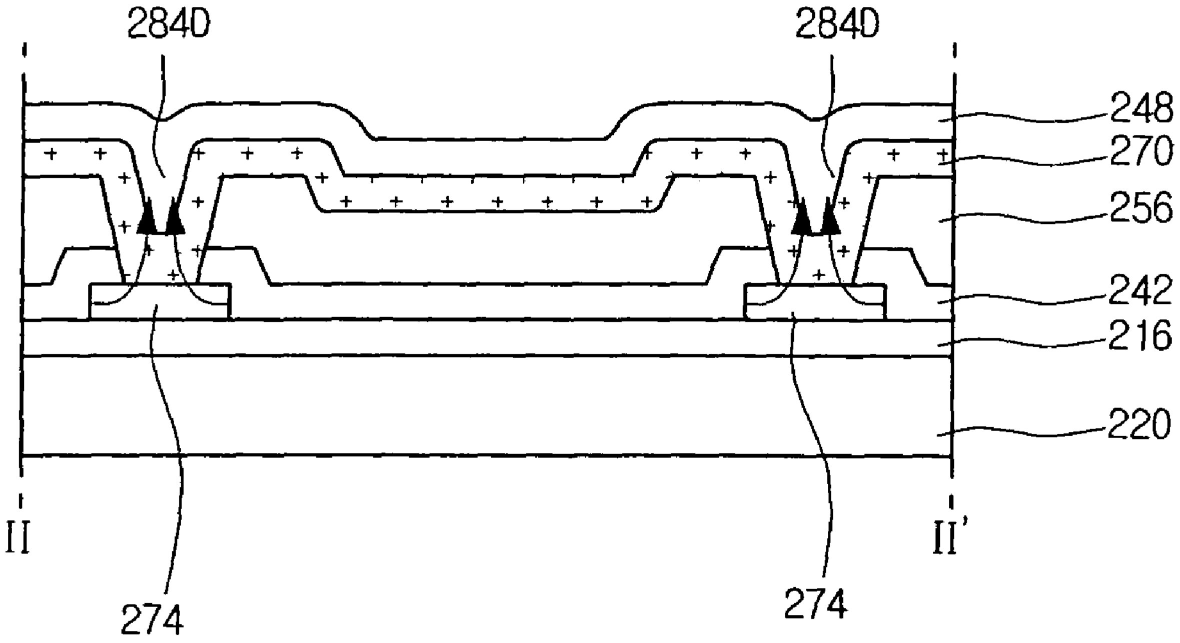
FIG. 5 is a sectional view taken along the line II-II' of FIG. 4.
Figure 6:
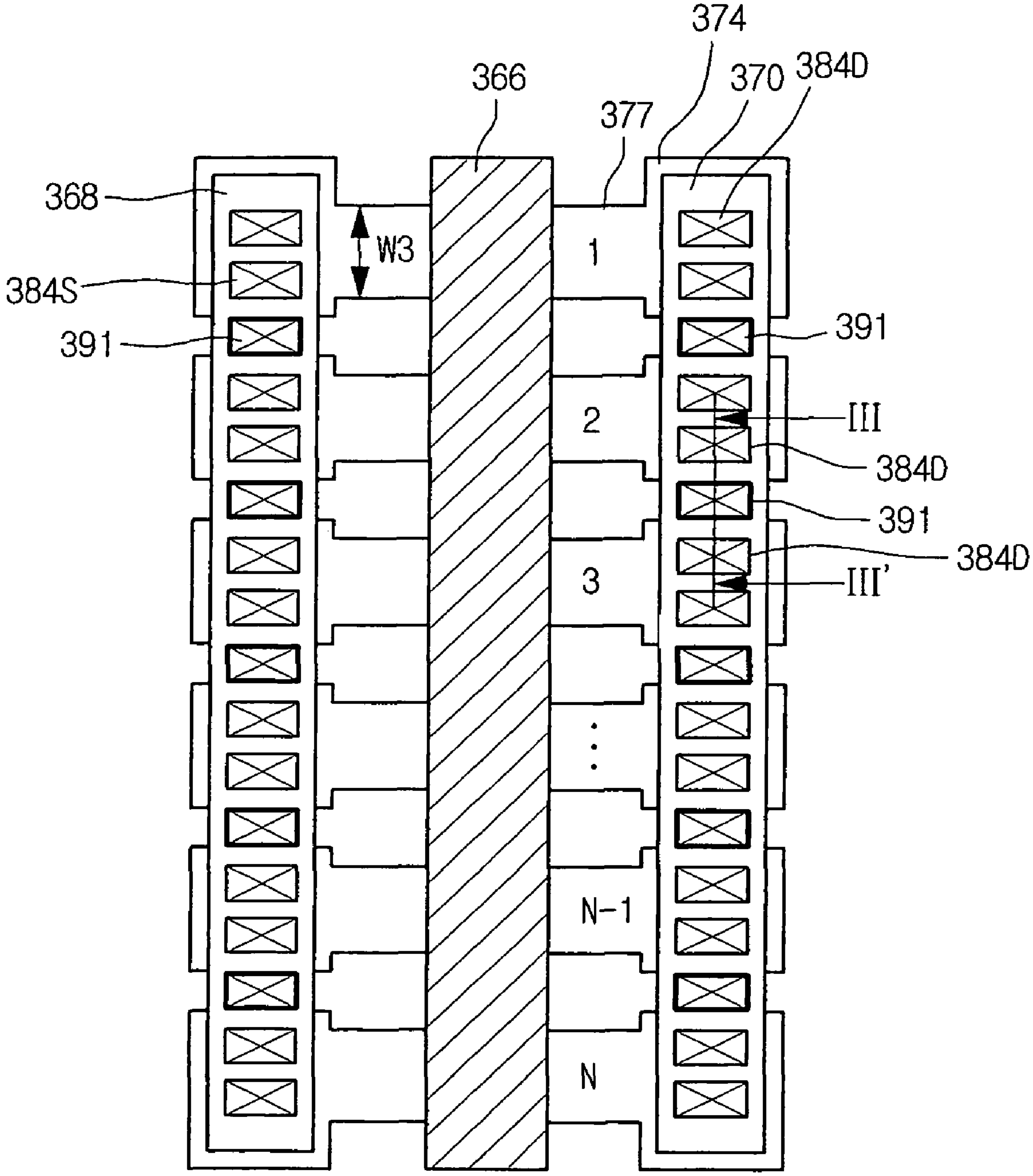
FIG. 6 is a plane view of a driving element according to an embodiment of the present invention in which a plurality of TFTs formed on a driving circuit part of an LCD are connected in parallel.
Figure 7:
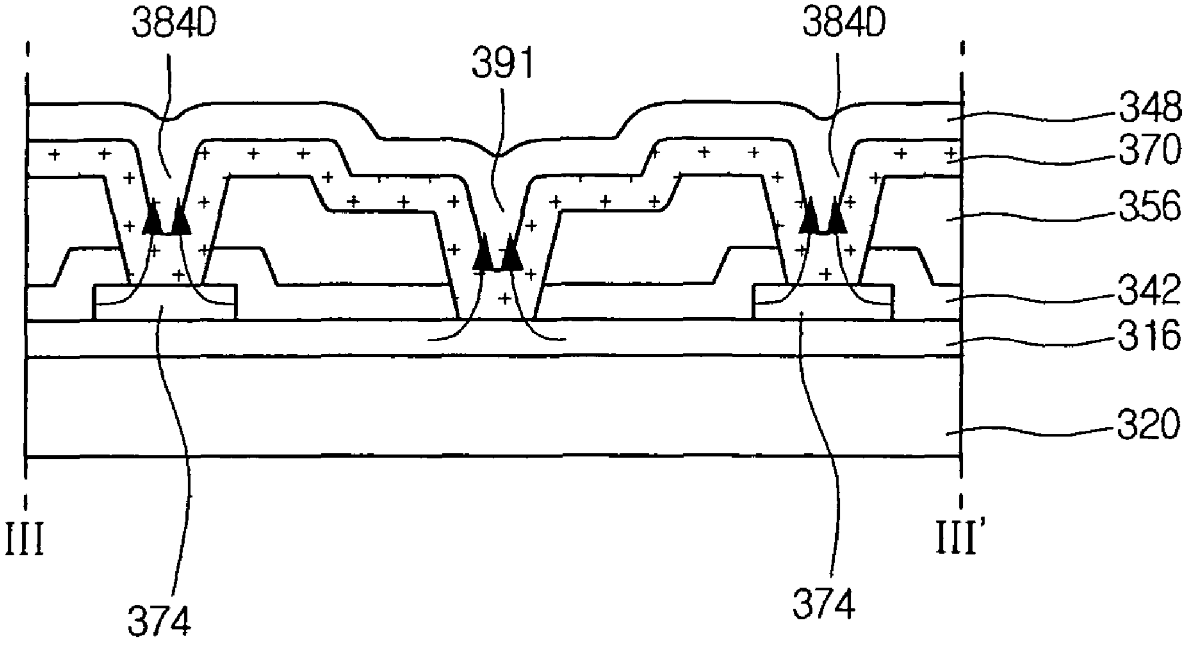
FIG. 7 is a sectional view taken along the line III-III' of FIG. 6.

FIG. 6 is a plane view of a driving element according to an embodiment of the present invention in which a plurality of polysilicon TFTs formed on a driving circuit part of an LCD are connected in parallel, and FIG. 7 is a sectional view taken along the line III-III' of FIG. 6. While FIG. 7 illustrates a section taken along the line III-III' on a drain electrode of FIG. 6, it may be substantially similar in structure to that of the source electrode of the unit TFTs.

As illustrated in FIGS. 6 and 7, a driving element of a driving circuit part having a plurality of unit TFT includes an impurity (n+ ions or p+ ions)-doped active layer 374, and a gate electrode 366 overlapping a channel region 377 of the active layer 374 with interposing a gate insulating layer 342 between them. The driving element also includes a source electrode 368 and a drain electrode 370 insulated from the gate electrode 366 by an interposing insulating layer 356, and a passivation layer 348 formed on the source electrode 368 and the drain electrode 370. FIG. 7 further illustrates a substrate 320 and a buffer layer 316.

The source electrode 368 and the drain electrode 370 are respectively in electrical contact with source and drain regions (source connections not shown; drain connections illustrated in FIG. 7) of the active layer 374 through source and drain contact holes 384S and 384D penetrating the gate insulating layer 342 and the interlayer insulating layer 356. The passivation layer 348 is formed on the source electrode 368 and the drain electrode 370 to function to protect the driving element.

As illustrated in FIG. 7, in the unit TFT, patterns of the active layer 374 corresponding to regions of the source electrode 368 and the drain electrode 370 are separate from each other. Thus, the active layer 374 provided with a gate electrode 366, the source electrode 368, the drain electrode 370 and the parallel multi-channels forms a divided multi-channel TFT.

A dummy contact hole 391 penetrating the interlayer insulating layer 356 and the gate insulating layer 342 in the region of the drain electrode 370 between the TFTs is formed substantially adjacent to the active layer 374. The region of the drain electrode 370 between the unit TFTs is in contact with the buffer layer 316 through the dummy contact hole 391 penetrating the gate insulating layer 342 and the interlayer insulating layer 356 between the patterns of the active region. If the dummy contact hole 391 is formed penetrating the buffer layer 316, a metal layer forming the source electrode 368 and the drain electrode 370 may be in contact with the lower substrate 320.

Accordingly, heat generated from the channels of the TFTs is conducted into the metal layer forming the source electrode 368 and the drain electrode 370 disposed between the active layers between the unit TFTs and then radiated to the outside, thereby preventing the driving element of the driving circuit part from being damaged. In other words, dummy contact hole 391 substantially provides a thermally conductive path from the channels, through the buffer layer 316, and to the thermally radiative metal layer. An exemplary thermal conductive path is illustrated by arrows in FIG. 7

Figure 8A:
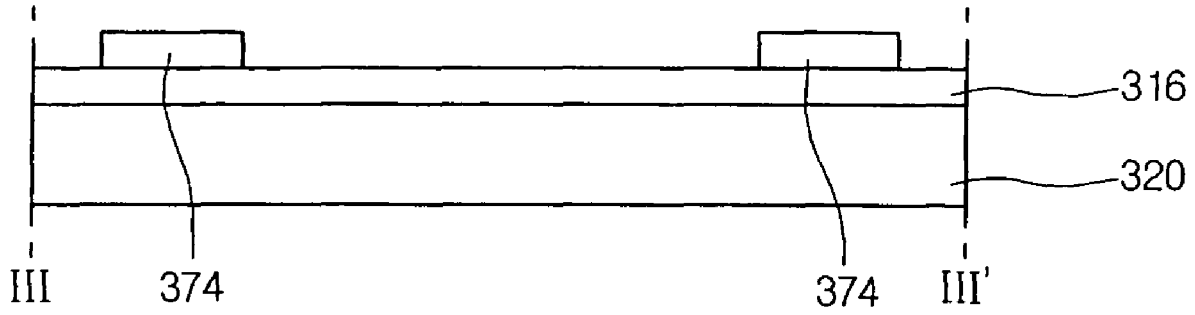
FIGS. 8A through 8C are sectional views illustrating a method of fabricating a driving element of a driving circuit part in an LCD according to the present invention.
Figure 8B:
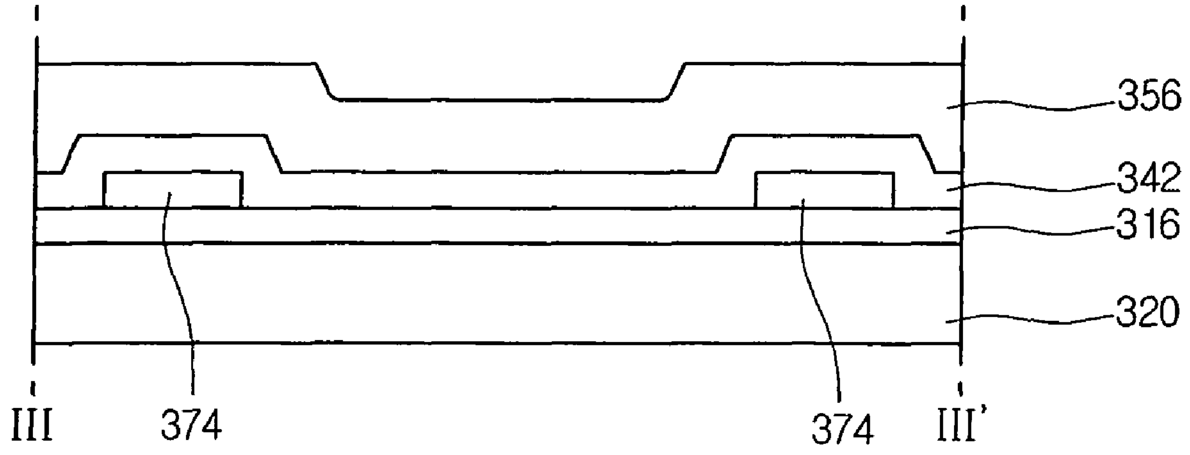
Figure 8C:
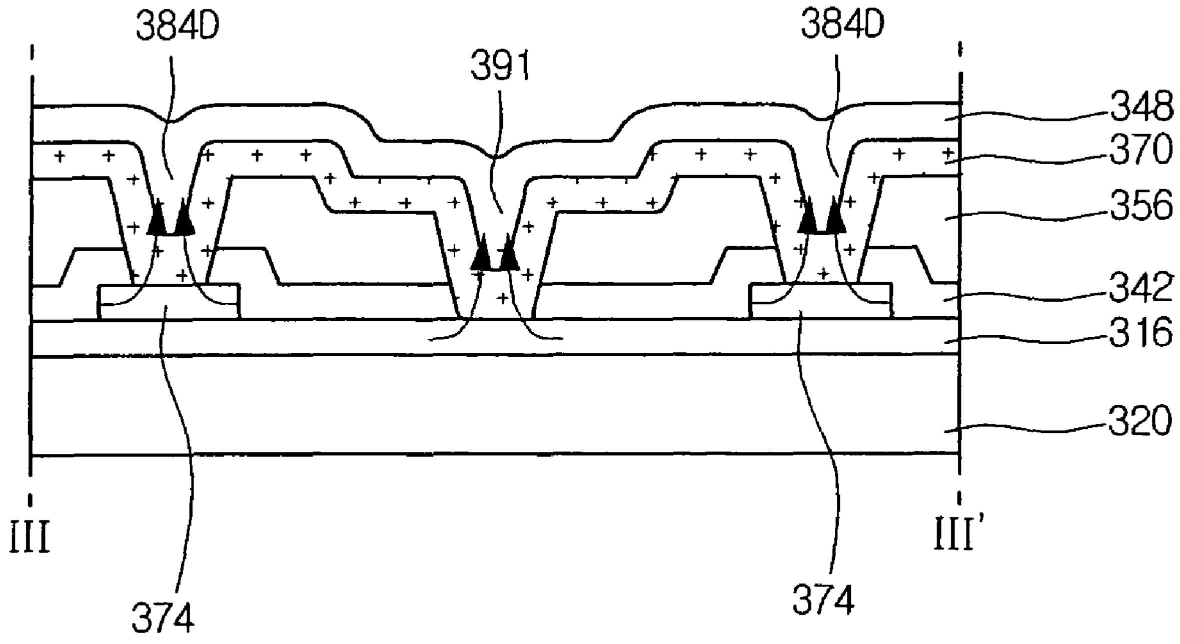

FIGS. 8A through 8C are sectional views illustrating a method of fabricating a driving element of a driving circuit part in an LCD according to the present invention.

First, as illustrated in FIG. 8A, a buffer layer 316 is formed on a lower substrate 320. The buffer layer 316 may include $SiO_2$ or some other insulating material.

Next, an amorphous silicon layer is deposited on the resultant lower substrate 320 having the buffer layer thereon 316, and is then crystallized to a polysilicon layer by use of a laser. Other methods of forming the polysilicon layer are possible and within the scope of the invention. The polysilicon layer is patterned by a photolithography process using a mask and an etch process to form an active layer 374. The result is a patterned active layer 374 for the unit TFTs of a driving element.

Next, as illustrated in FIG. 8B, an insulating material such as $SiO_2$ is deposited substantially on an entire surface of the resultant lower substrate 320 including the active layer 374 and the buffer layer 316 to form a gate insulating layer 342.

Although not illustrated in the drawings, a gate metal layer may be deposited substantially on an entire surface of the resultant lower substrate 320 including the gate insulating layer 342, and then patterned by a photolithography process using a mask and an etch process to form a gate electrode (see 366 of FIG. 6). The gate metal layer may be made of aluminum (Al)-based metal such as Al, Al/Nd or the like.

Also, although not illustrated in the drawing, $n^-$ ions may be implanted into the active layer 374 using the gate electrode 366 as a mask. By doing so, the active layer 374 overlapping the gate electrode 366 may serve as a channel region, and the active layer that does not overlap the gate electrode may serve as a lightly doped drain (LDD) region.

Next, a photoresist pattern is formed on the active layer 374 to expose the LDD region. Then, n+ ions or p+ ions are implanted into the active layer 374 using the photoresist pattern as a mask, thereby forming source and drain regions (not shown) in the active layer 374.

Next, an insulating material such as SiO2 is deposited substantially on an entire surface of the resultant lower substrate 320 having the active layer 374 doped with n+ ions or p+ ions thereon to form an interlayer insulating layer 356. Subsequently, the interlayer insulating layer 356 and the gate insulating layer 342 are patterned by a photolithography process and an etch process, as illustrated in FIG. 8C.

Accordingly, a drain contact hole 384D partially exposing the active layer 374 is formed, and a dummy contact hole 391 may be formed between the patterns of the active layer 374 by the same process as that of forming the drain contact hole 384D. The dummy contact hole 391 may be formed penetrating the interlayer insulating layer 356 and the gate insulating layer 342. In another aspect, the dummy contact hole 391 may penetrate the buffer layer 316 in addition to the interlayer insulating layer 356 and the gate insulating layer 342. In either case, the dummy contact hole 391 may expose the buffer layer or the substrate 320.

Next, a metal layer is deposited on an entire surface of the resultant lower substrate 320 having the drain contact hole 384D and the dummy contact hole 391. The metal layer is then patterned by a photolithography process using a mask and an etch process, thereby forming a source electrode (see 368 of FIG. 6) and a drain electrode 370. FIG. 8C illustrates a sectional of a portion where the drain electrode 370 is formed.

The source and drain electrodes 368 and 370 contact the active layer through the source and drain contact holes 384S and 384D. Also, the source and drain electrodes 368 and 370 made of the metal layer contact the buffer layer 316 or an upper surface of the lower substrate 320 through the dummy contact hole 391 formed between the patterns of the active layer 374.

Accordingly, heat generated from the TFTs is conducted into the metal layer formed between the patterns of the active layer 374 between the unit TFTs and is then radiated to the outside, thereby substantially preventing the driving element of the driving circuit part from being damaged, or having its performance degraded, due to excess heat.

Figure 9:
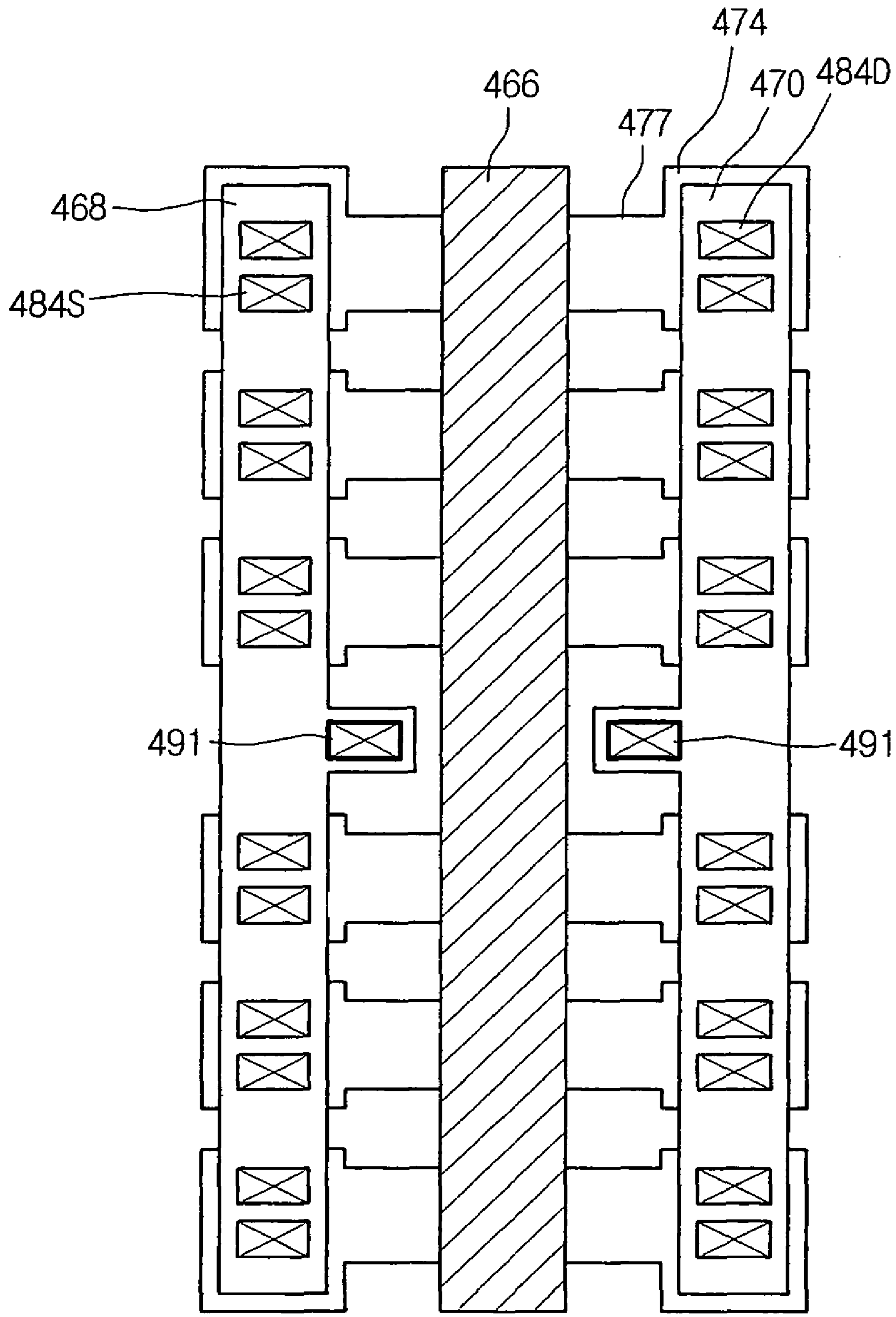
FIG. 9 is a plane view of a driving element of a driving circuit part of an LCD according to another embodiment of the present invention.

FIG. 9 is a plane view of a driving element having a structure where a plurality of polysilicon TFTs formed in a driving circuit part of an LCD are connected in parallel according to another embodiment of the present invention.

As illustrated in FIG. 9, the driving element of the driving circuit part includes a plurality of parallel unit TFTs sharing a gate electrode 466, each unit TFT having a unit channel 477. Each of the unit TFTs includes an impurity (for example, n+ ions or p+ ions)-doped active layer 474, a gate electrode overlapping a channel region 477 of the active layer 474, a source electrode 468, and a drain electrode 470 insulated from each other with interposing an interlayer insulating layer (not shown) between them.

The source electrode 468 and the drain electrode 470 are respectively contacted with source and drain regions of the active layer 474 through the source and drain contact holes 484S and 484D. In the unit TFT, the respective patterns of the active layer 474 of the source electrode 468 and drain electrode 470 are formed separately from each other.

A dummy contact hole 491 penetrating the interlayer insulating layer and the gate insulating layer is formed adjacent to the channel region 477 at a location between two subgroups of unit TFTs. One dummy contact hole 491 is located in a space between the source electrodes 468, and another is located in a space between the drain electrodes 470. The dummy contact holes 491 may be formed extending toward the channel region in the space between the unit TFT subgroups. In this case, either the source electrode 468, the drain electrode 470, or both, have a projection or protrusion extending toward the gate electrode 466. A dummy contact hole 491 may be located under the protrusion. Further, locating the dummy contact hole 491 under a projection enables the dummy hole to be in a proximity relative to the gate electrode such that it may more effectively conduct heat away from the channel region 477.

The heat sink formed by the dummy contact hole 491 is designed as described because a TFT having multi channels has the highest temperature at a central channel 477. In the embodiment of FIG. 9, the plurality of unit TFTs may be divided into two subgroups, and the dummy contact hole 491 may be formed at a central portion between. Alternatively, the plurality of unit TFTs may be divided into at least three parts and a plurality of dummy contact holes may be formed between them accordingly. Alternatively, the dummy contact hole 491 may penetrate the interlayer insulating layer and the gate insulating layer to expose the buffer layer.

Although not illustrated in the drawing, if the dummy contact hole 491 penetrates the buffer layer formed below the active layer 474, the metal layer forming the source electrode 468 and the drain electrode 470 can be contacted with the lower substrate below the buffer layer, such as the underlying substrate.

Figure 10:
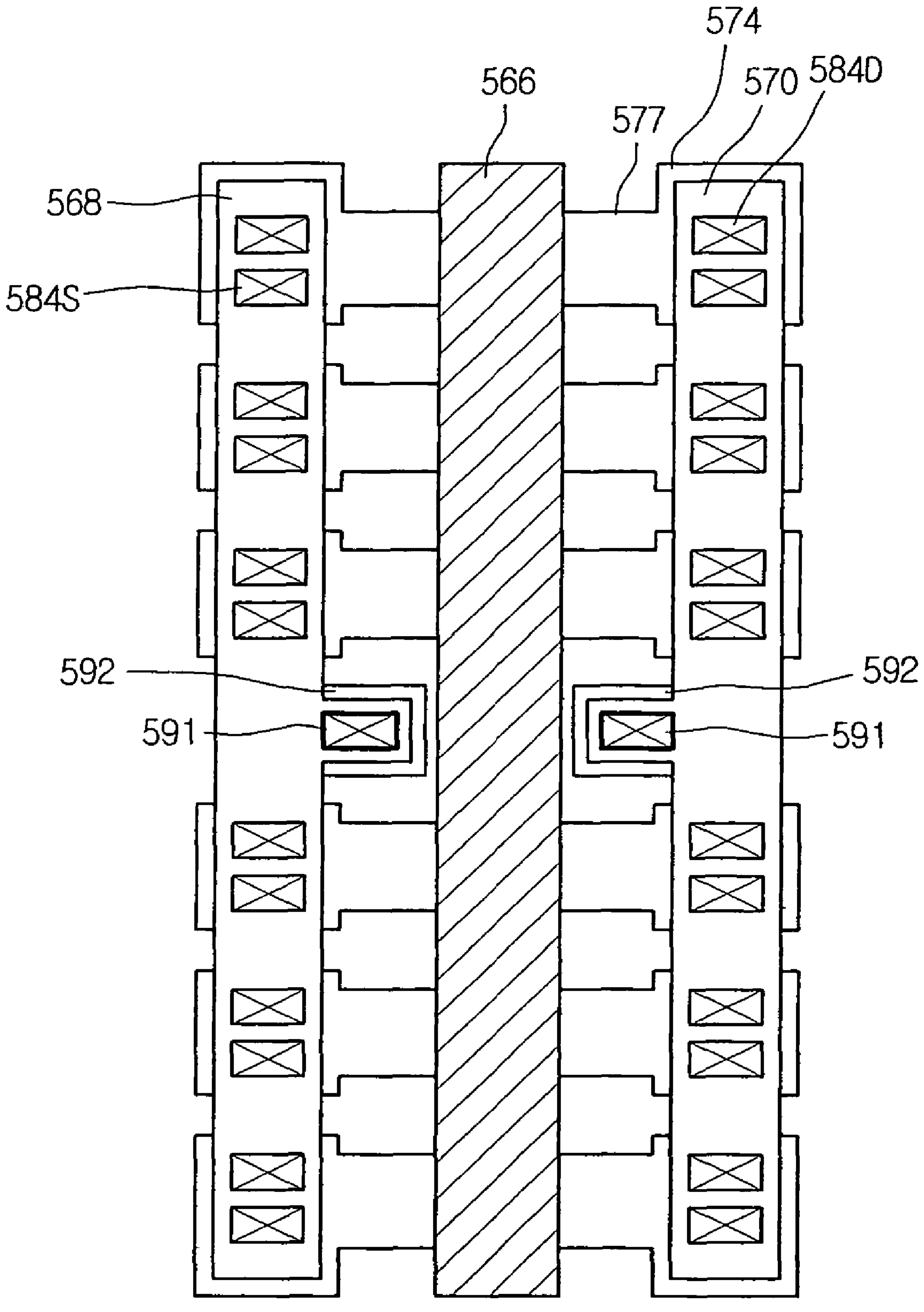
FIG. 10 is a plane view of a driving element of a driving circuit part of an LCD according to still another embodiment of the present invention.

FIG. 10 is a plane view of a driving element having a structure where a plurality of polysilicon TFTs formed in a driving circuit part of an LCD are connected in parallel according to a further embodiment of the present invention. Whenever possible, detailed description of the elements which have a substantially similar structure as those of FIG. 9 will be omitted.

As illustrated in FIG. 10, the driving element of the driving circuit part includes a plurality of unit TFTs each unit TFT having a unit channel 577. Source electrode 568 and drain electrode 570 are respectively contacted with an active layer 574 through source and drain contact holes 584S and 584D penetrating an insulating layer. In the unit TFT, the respective patterns of the active layer 574 of the source electrode 568 and drain electrode 570 are separate from each other.

A dummy contact hole 591 penetrating the interlayer insulating layer and the gate insulating layer is formed adjacent to a channel region 577 at a space where the plurality of unit TFTs are divided into subgroups. The dummy contact hole 591 on either side of the channel region 577 may be formed extending from either the source electrode 568 or the drain electrode 570 toward the gate channel 566.

A dummy active layer 592 separate from the active layer 574 may be formed substantially around the dummy contact holes. In such an embodiment, the dummy contact hole 591 is formed within the dummy active layer 592. The dummy active layer 592 may be formed concurrently with the active layer 574. The dummy active layer 592 may have a larger area than the dummy contact hole 591. The source and drain electrodes 568 and 570 each have a protrusion toward the channel region 566 at which the dummy active layer 592 and dummy contact hole 591 are formed. The source and drain electrodes 568 and 570 formed extending toward the channel region 577 by the dummy contact hole 591 penetrate the gate insulating layer and the interlayer insulating layer to contact the dummy active layer 592.

The dummy active layer 592 may be made of polysilicon like the active layer 574, although other materials may be used that have superior thermal conductivity.

In the embodiment of FIG. 10, the plurality of unit TFTs are divided into two subgroups, and the dummy active layer 592 and the dummy contact hole 591 are formed at a central portion. Alternatively, the plurality of unit TFTs may be divided into at least three subgroups between which a plurality of dummy active layers and dummy contact holes may be formed.

According to the present invention, heat generated from the TFTs is conducted by a metal layer formed between the active layers between the unit TFTs and is then radiated to the outside, which may prevent the driving element from being damaged, or suffering performance degradation. Although in the described embodiments the dummy contact hole provides a thermally conductive path from either the buffer layer or the substrate to the outside, it will be apparent to one of ordinary skill that the dummy contact hole may provide contact with any suitable layer within the driving element structure, provided that the contact will improve heat dissipation from the channel regions.

As described above, according to the present invention, a dummy contact hole is formed between respective channels of unit TFTs within the driving element of a driving circuit, thereby more effectively radiating heat generated from the channels through a metal layer and preventing the driving element from degrading or failing due to the heat.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of fabricating a liquid crystal display device, the method comprising:

forming a buffer layer on a substrate;

forming an active layer having at least two separate channels on the buffer layer;

forming a first insulating layer on the buffer layer and the active layer;

forming a gate electrode on the first insulating layer;

forming a second insulating layer on the gate electrode and the first insulating layer;

forming contact holes penetrating the first insulating layer and the second insulating layer;

forming a first dummy contact hole penetrating the first insulating layer and the second insulating layer in a region between the channels of the active layer; and forming source and drain electrodes connected with the active layer through the contact holes and connected with a lower layer through the first dummy contact hole, wherein the source electrode has a protrusion toward the gate electrode, and wherein the source electrode protrusion is disposed on the first dummy contact hole, wherein the drain electrode has a protrusion toward the gate electrode, and wherein the drain electrode protrusion is disposed on a second dummy contact hole.

2. The method according to claim 1, wherein the forming the active layer includes forming the active layer having polysilicon.

3. The method according to claim 1, wherein the gate electrode, the source electrode, the drain electrode, and the at least two separate channels form a divided multi-channel transistor.

4. The method according to claim 1, wherein the lower layer is one of the buffer layer and the substrate.

5. The method according to claim 1, wherein the active layer includes a dummy active layer, the dummy active layer being separate from the remainder of the active layer, the dummy active layer at least partially surrounding the first dummy contact hole.

* * * * *